Patented June 6, 1944

2,350,325

UNITED STATES PATENT OFFICE 2,350,325

UNSATURATED ESTER OF ALKOXY-ARYLOXY ALCOHOLS

Gerald H. Coleman and Bartholdt C. Hadler, Midland, Mich., assignors to The Dow Chemical Company, Midland, Mich., a corporation of Michigan No Drawing. Application September 25, 1941,
Serial No. 412,298

2 Claims. (Cl. 260—486)

This invention concerns esters of alkoxy-aryloxy-substituted lower alcohols with certain unsaturated aliphatic mono-carboxylic acids, said esters having the general formula

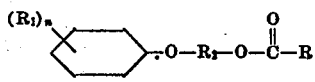

wherein $R_1$ represents an alkoxy substituent, $R_2$ represents a lower alkylene radical containing from two to six carbon atoms, R represents an aliphatic hydrocarbon radical containing not more than ten carbon atoms and at least one ethylenic linkage, $n$ represents the number of substituents on the aryl nucleus and is not greater than 2. All such esters are high-boiling liquids or crystalline solids which are substantially insoluble in water, but are readily soluble in organic solvents. The compounds are useful as plasticizing or modifying agents for vinyl resins, e. g. polystyrene, and cellulose derivative (e. g. ethyl cellulose, cellulose acetate, etc.) compositions.

The unsaturated esters of the present class are conveniently prepared by esterifying an alkoxy-aryloxy alcohol, e. g. beta-(2-methoxy-phenoxy)-ethanol, with an aliphatic mono-carboxylic acid which contains not more than ten carbon atoms and at least one ethylenic linkage in the aliphatic residue, e. g. crotonic acid, acrylic acid, beta-ethyl-acrylic acid, undecylenic acid, sorbic acid, etc. The reaction may be carried out by heating at a temperature of about 60°-130° C. a mixture of the aryloxy alcohol with approximately one chemical equivalent of the unsaturated mono-carboxylic acid and a small proportion of an esterification catalyst, e. g. approximately 0.01–0.04 molecular equivalent of a strong acid, such as sulphuric or benzene sulphonic acid. Water is formed in the reaction and, if desired, a water-immiscible organic solvent, such as benzene or toluene, may be added to the reaction mixture for the purpose of promoting distillation and removal of the water during the esterification. Upon completion of the reaction, the mixture is treated with sufficient alkali to neutralize any free acid, washed with water, and the ester product is separated and purified by fractional distillation or crystallization.

The following example is illustrative of the preparation of the esters of the present class but is not to be construed as limiting the invention:

Example

A mixture of 128 grams (0.76 mol) of beta-(2-methoxy-phenoxy)-ethanol, 64.5 grams (0.75 mol) of crotonic acid, and 5 grams of benzene sulphonic acid was heated at a temperature of approximately 86°–91° C. for 5 hours. Upon completion of the reaction, the mixture was allowed to cool, dissolved in benzene, and washed with dilute aqueous sodium bicarbonate solution. The benzene was then distilled off and the ester product was purified by fractional distillation under vacuum. There was obtained beta-(2-methoxy-phenoxy)-ethyl crotonate, a colorless liquid distilling at approximately 135°–138° C. under 1 millimeter pressure and having a specific gravity of about 1.1234 at 25/4° C. and the formula

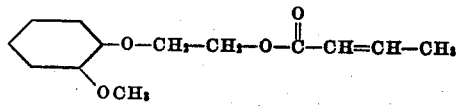

Other unsaturated alkoxy-aryloxy-alkyl esters of the present class may be prepared by the general method illustrated by the foregoing example. For example, beta-(2-ethoxy-phenoxy)-propanol may be reacted with tiglic acid to produce beta-(2-ethoxy-phenoxy)-propyl tiglate; beta-(2-butoxy-phenoxy)-ethanol with methacrylic acid to produce beta-(2-butoxy-phenoxy)-ethyl methacrylate; gamma-(2-methoxy-phenoxy)-propanol with vinyl acetic acid to produce gamma-(2-methoxy-phenoxy)-propyl vinylacetate; beta-(2-propoxy-phenoxy)-butanol with beta-ethylacrylic acid to produce beta-(2-propoxy-phenoxy)-butyl beta-ethylacrylate; beta-(2.3-dimethoxy-phenoxy)-ethanol with crotonic acid to produce beta (2.3-dimethoxy-phenoxy)-ethyl crotonate; beta (3.5-diethoxy-phenoxy)-ethanol with tiglic acid to produce beta-(3.5-diethoxy-phenoxy)-ethyl tiglate, etc.

This application is a continuation-in-part of our co-pending application Serial No. 371,592 filed December 24, 1940; which is a continuation-in-part of our-copending application Serial No. 321,314, filed February 28, 1940; which in turn, is a continuation-in-part of application Serial No. 177,655, filed December 1, 1937.

We claim:

1. An ester of an alkoxy-aryloxy-substituted ethyl alcohol and an unsaturated aliphatic mono-carboxylic acid, said ester having the general formula

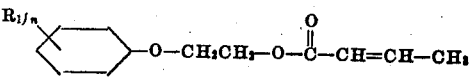

wherein $R_1$ represents an alkoxy substituent, and $n$ represents an integer not greater than 2.

2. Beta-(2-methoxy-phenoxy)-ethyl crotonate.

GERALD H. COLEMAN.
BARTHOLDT C. HADLER.